United States Patent
Maier

(10) Patent No.: US 9,140,216 B2
(45) Date of Patent: Sep. 22, 2015

(54) SUPERCHARGED TURBOCOMPOUND HYBRID ENGINE APPARATUS

(75) Inventor: Christian Maier, Arbon (CH)

(73) Assignee: FPT Motorenforschung AG, Arbon (CH)

( * ) Notice: Subject to any disclaimer, the term of this patent is extended or adjusted under 35 U.S.C. 154(b) by 172 days.

(21) Appl. No.: 14/122,360

(22) PCT Filed: May 30, 2012

(86) PCT No.: PCT/EP2012/060120
§ 371 (c)(1),
(2), (4) Date: Nov. 26, 2013

(87) PCT Pub. No.: WO2012/163956
PCT Pub. Date: Dec. 6, 2012

(65) Prior Publication Data
US 2014/0190163 A1 Jul. 10, 2014

(30) Foreign Application Priority Data
May 30, 2011 (EP) .................................... 11168087

(51) Int. Cl.
*F02B 33/44* (2006.01)
*F02M 25/07* (2006.01)
*F02B 37/00* (2006.01)
*F02B 37/013* (2006.01)
*F02B 37/10* (2006.01)
*F02B 37/14* (2006.01)
*F02B 37/16* (2006.01)
(Continued)

(52) U.S. Cl.
CPC .......... *F02M 25/0704* (2013.01); *F02B 37/004* (2013.01); *F02B 37/013* (2013.01); *F02B 37/10* (2013.01); *F02B 37/14* (2013.01); *F02B 37/16* (2013.01); *F02B 39/10* (2013.01); *F02B 41/10* (2013.01); *F02D 28/00* (2013.01); *Y02T 10/144* (2013.01); *Y02T 10/163* (2013.01)

(58) Field of Classification Search
CPC ...... F02B 37/004; F02B 37/013; F02B 37/10; F02B 37/14; F02B 37/16; F02B 39/10; F02B 41/10; F02D 28/00; F02M 25/0704; Y02T 10/144; Y02T 10/163
USPC ............................... 60/39.6–39.63, 597–624; 123/559.1–566, 200–249
See application file for complete search history.

(56) References Cited

U.S. PATENT DOCUMENTS

| | | | |
|---|---|---|---|
| 2,173,595 A | 9/1939 | Schutte | |
| 6,286,312 B1 * | 9/2001 | Bertilsson | 60/605.2 |

(Continued)

FOREIGN PATENT DOCUMENTS

| | | |
|---|---|---|
| DE | 102005003714 | 8/2006 |
| DE | 102009033519 | 11/2010 |

(Continued)

*Primary Examiner* — Jesse Bogue
(74) *Attorney, Agent, or Firm* — Stetina Brunda Garred & Brucker

(57) ABSTRACT

The present invention is relative to a control method of a turbo-compound engine apparatus wherein said apparatus comprises a low pressure compressor connected to the high pressure turbine and a low pressure turbine connected to a high pressure compressor by means of a coupling unit. The apparatus also comprises first bypassing means of said high pressure compressor. The method according to the invention comprises the step of deactivating said first bypassing means when at least a specific condition occurs.

13 Claims, 4 Drawing Sheets

(51) Int. Cl.
*F02B 39/10* (2006.01)
*F02B 41/10* (2006.01)
*F02D 28/00* (2006.01)

(56) References Cited

U.S. PATENT DOCUMENTS

| | | | |
|---|---|---|---|
| 6,658,848 B1* | 12/2003 | Pierpont | 60/602 |
| 7,735,320 B2* | 6/2010 | Yanakiev | 60/602 |
| 2002/0062646 A1* | 5/2002 | Dellora et al. | 60/602 |
| 2008/0000226 A1* | 1/2008 | Arndt et al. | 60/599 |
| 2010/0050632 A1* | 3/2010 | Vuk | 60/605.1 |
| 2011/0020108 A1* | 1/2011 | Axelsson et al. | 415/66 |
| 2011/0041497 A1* | 2/2011 | Cavallo et al. | 60/612 |
| 2011/0100339 A1* | 5/2011 | Weyer et al. | 123/563 |
| 2012/0222417 A1* | 9/2012 | Fontvieille et al. | 60/602 |

FOREIGN PATENT DOCUMENTS

| | | |
|---|---|---|
| EP | 0417732 A2 | 3/1991 |
| WO | WO9202719 | 2/1991 |

* cited by examiner

TC2 = Double Turbocompound
2Stage = Two stage Turbocharging
VTG = Variable turbine geometric
TCD = Turbocompound
iTC = Inversed Double Turbocompound (according to the present invention)

SUPERCHARGED TURBOCOMPOUND HYBRID ENGINE APPARATUS

CROSS REFERENCE TO RELATED APPLICATIONS

The present application claims priority to PCT International Application No. PCT/EP2012/060120 filed on May 30, 2012, which application claims priority to European Patent Application No. 11168087.2 filed May 30, 2011.

STATEMENT RE: FEDERALLY SPONSORED RESEARCH/DEVELOPMENT

Not Applicable.

BACKGROUND

1. Field of the Invention

The present invention relates to a supercharged turbocompound engine apparatus and its operating control method, in particular for industrial vehicles. The invention finds application also in the field of marine engines, transport vehicles and agricultural applications, independently from the kind of fuel, gasoline, diesel or gas.

Two-stage turbocharging has been proposed as means for achieving high efficiency in engines, in particular heavy duty diesel engines, such as those for industrial vehicles or ships. Two turbosuperchargers are placed in series on the engine intake line, driven by turbines placed on the exhaust line, which can also be placed in series, or arranged in another way.

The turbocompound solution comprises two turbines placed in series on the exhaust line, where the low pressure one is connected to the crankshaft of the diesel engine by means of a step down gear. Therefore, such second turbine provides a supplementary torque to the engine.

A double turbocompound scheme is disclosed by the patent EP2042705. It shows a high pressure turbine and a low pressure turbine arranged on the exhaust line. Such turbines may be placed in parallel or in series between each other by means of appropriate connections and reduction valves, especially when the two turbines are parallel configured, due to the different characteristics of the two turbines.

The high pressure turbine is mechanically connected with a high pressure supercharger.

The low pressure turbine is connected to the crankshaft by means of a mechanical link. The link comprises means to reduce the speed variations, placed between the second turbine and crankshaft, as in the case of conventional turbocompound engines. Moreover, such mechanical link also connects a low pressure supercharger, arranged on the intake line, upstream with respect a high pressure supercharger, the latter being directly connected to the intake of the combustion engine.

Driven Compressor and Powerturbine are coupled via hydrodynamic clutch and reduction gear to the engine. The purpose of the hydrodynamic clutch is to reduce the torque oscillation from crankshaft to the Turbomachinery gears. An additional function of the clutch in EP2042705 is to connect and disconnect the driven Compressor and Powerturbine from the engine. This function enable to run the system as a free running low pressure turbocharger with some additional gear friction losses.

WO 2010/066452 teaches to manage the slip of the hydrodynamic clutch boost, for controlling backpressure, of exhaust gases, and EGR.

The low pressure supercharger receives mechanical energy from the engine or also from the low pressure turbine via such link.

DE 102005003714 shows a two stage compound system. Thanks to this scheme, the driven low pressure compressor needs high energy to generate boost. However, the controllability of the mechanical driven low pressure compressor is hard to handle.

A classic turbocompound scheme is able to provide a fuel consumption reduction, ranged between the 5 and 10%, and a better power density ranged between the 100 and 110%, with respect to a combustion engine provided with variable turbine geometry (VTG).

Power density is defined as Power [kW]/engine displacement [l(liter)] so called specific power output. This output is between 30-34 kW/l for modern heavy duty diesel systems with electronic controllable VTG. Two stage and two stage compound systems can reach 50 kW/l.

At the opposite, a classic two stage turbocharged scheme is able to provide a lower fuel consumption reduction, ranged between the 0% and 5% and a better power density ranged between the 115 and 130% with respect to a VTG scheme.

The term turbocharger is synonymous with supercharger or compressor. It's also known, a so called, "electric turbocompound scheme" comprising a high pressure supercharger axially connected with a high* pressure turbine and a low pressure turbine axially connected with an electric generator which produces electric energy. An electric motor is also connected with the crankshaft of the combustion engine. A first inverter converts the energy produced by the electric generator in direct current injected in a DC bus and a second inverter, connected with said DC bus, is suitable to power supply the electric motor, which supplies a supplementary torque to the combustion engine.

SUMMARY OF THE INVENTION

Therefore it is the main object of the present invention is to provide method for controlling an engine apparatus which allows to reduce the fuel consumption and to increase the power density. Within this aim, a first object of the present invention is to provide a method for controlling an engine apparatus which allows to increase the engine braking power and to improve the recuperation strategy.

This main and these objects are achieved by a method for controlling an engine apparatus as indicated in Claim 1. As below specified many advantages can be achieved by means of the present invention. Firstly in the engine apparatus the advantages of the two stage turbo-charging systems single and of the double turbo-compound systems are concentrated in one engine apparatus scheme. Secondly by the control method according to the invention, it is possible to increase the engine brake power and to improve the energy recuperation strategy. In view of the connections between the turbines and the superchargers of the engine apparatus, the scheme of this invention is also named as "turbo-compound engine with inverse two stage turbo charging".

In particular, the engine apparatus scheme comprises;
  a. Low pressure compressor driven by the high pressure turbine, through a shaft;
  b. High pressure turbine and low pressure turbine connected serially along the exhaust line,
  c. Low pressure compressor and high pressure compressor connected serially along the intake line.

The engine apparatus scheme allows a plurality of different operative configurations each of which lead to a correspondent possible operative mode. In a possible configuration, for example the engine apparatus allows to increase the engine brake effect, while in another configuration the engine apparatus can be used, for example, to regulate the intervention of an Exhaust Recirculation System. The present invention enables to reduce the fuel consumption, to increase the power density, to improve the transient engine performance, to increase the engine brake power and to improve the recuperation strategy.

The dependent claims disclose preferred embodiments of the present invention, forming integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF THE INVENTION

Figure 1:
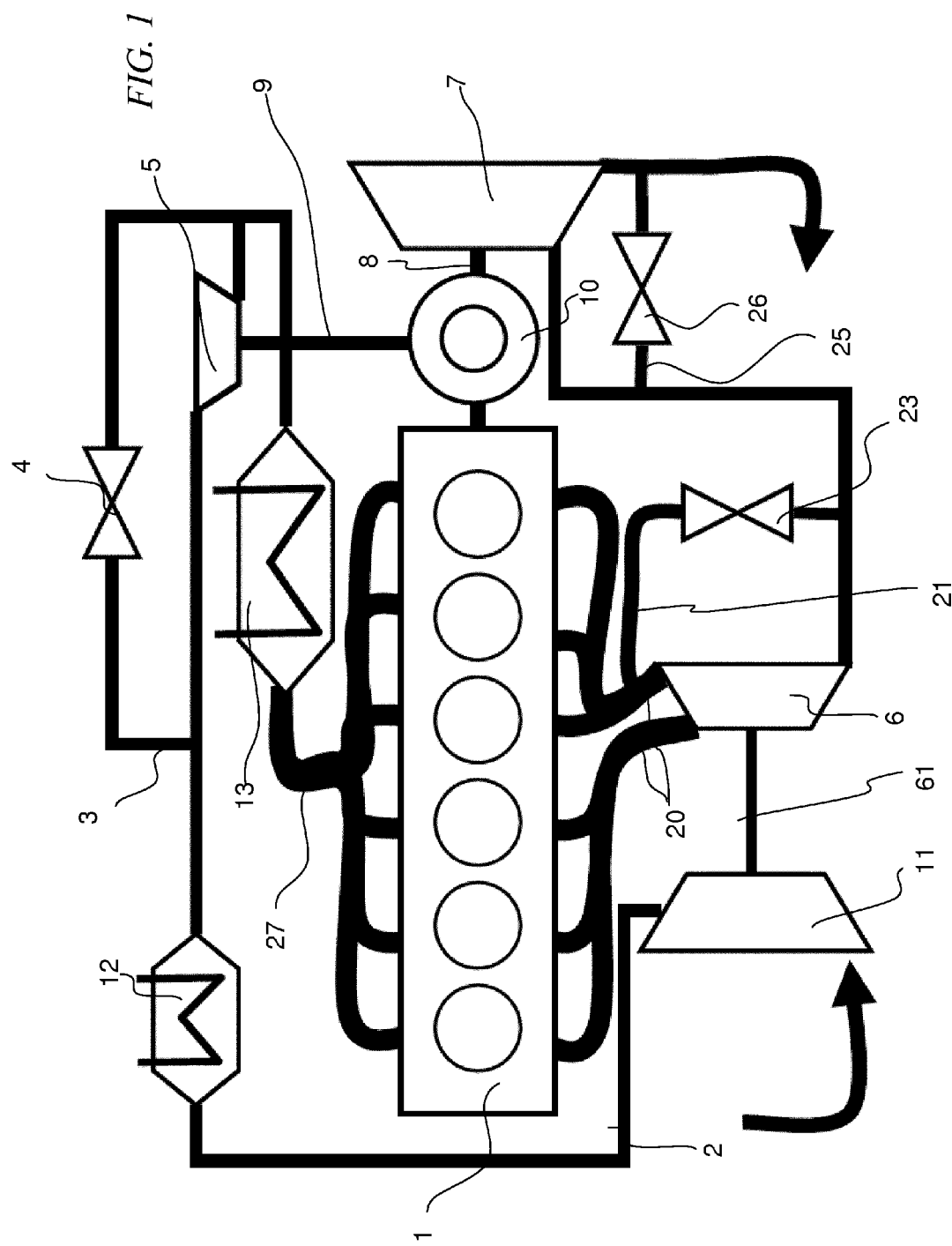
FIG. 1 shows a the embodiment of an engine hybrid apparatus according to the invention.
Figure 2:
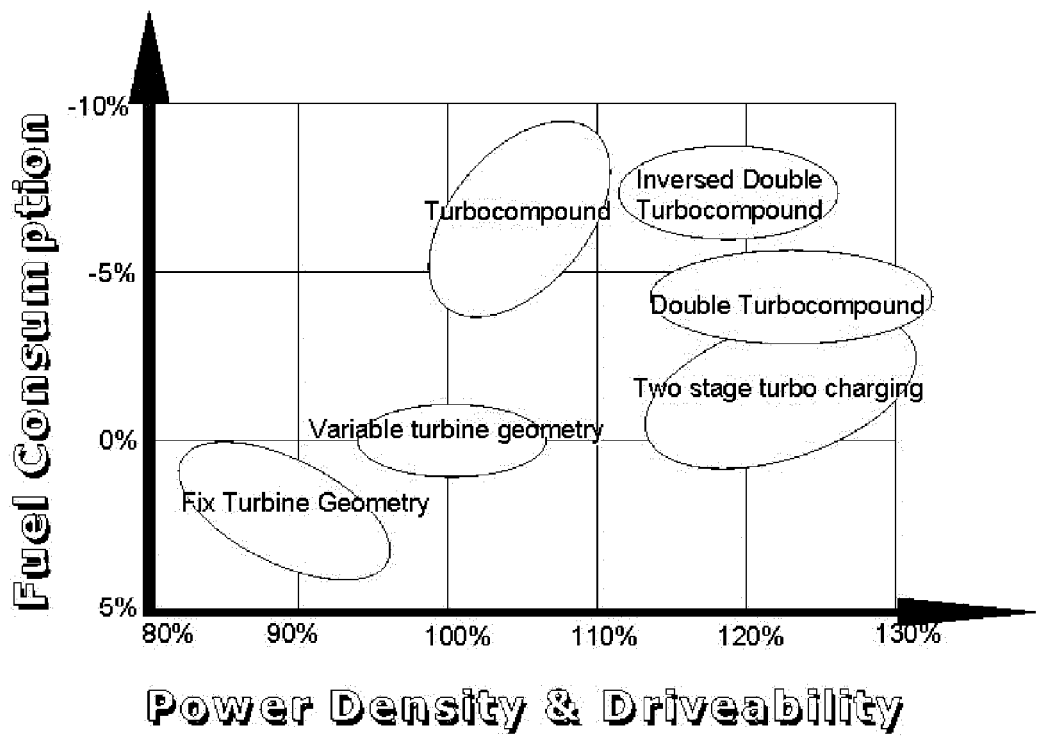
FIG. 2 shows a comparison between the performance of known apparatus and an apparatus according to the present invention.
Figure 3:
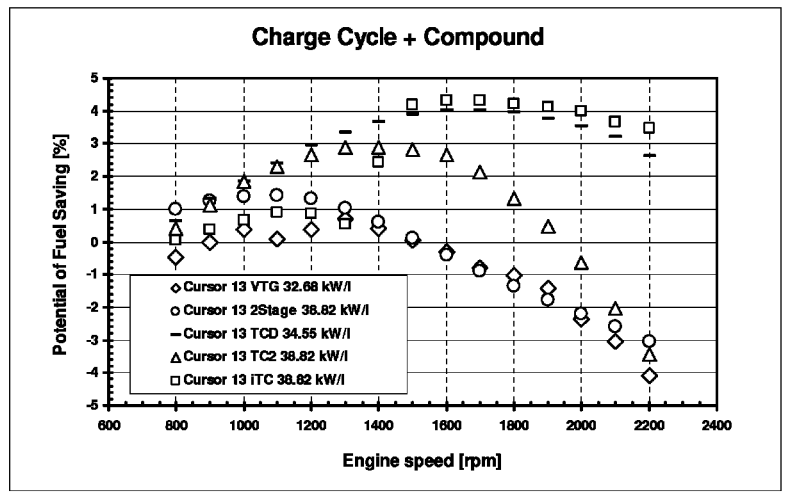
FIGS. 3-5 show a comparison of several supercharging systems applied to the same boundary condition of the engine.

FIG. 1 is a schematic illustration of an engine apparatus according to the present invention. The engine apparatus, for example of an industrial vehicle, of a ship or of another type, comprises the internal combustion engine 1, which can be a diesel engine.

The engine apparatus, for example of an industrial vehicle, of a ship or of another type, comprises the internal combustion engine 1, which can be a diesel engine. The apparatus comprises has an intake line 2 of the engine 1 and an exhaust line 20. Starting from the fresh air admission, on said intake line 2 are sequentially connected, according to the route of the fresh air, a low pressure compressor unit (LPC) 11,
a low pressure charge air cooler (LPCAC) 12,
a high pressure compressor (HPC) 5,
a high pressure charge air cooler (HPCAC) 13.

The intake line 2 comprises first bypass means 3,4 for bypassing the HPC 5. More in detail such bypass means comprises a pipe 3 and a valve 4. A first end and a second end of the pipe 3 are connected respectively upstream and downstream the HPC. With reference to the exhaust line 20, starting from the engine 1, on said exhaust line 20 are sequentially connected, according to the route of the exhaust gasses, a high pressure turbine (HPT) 6 and a low pressure turbine (LPT) 7.

The skilled person in the art knows what "low pressure" or "high pressure" turbine means and "low pressure" or "high pressure superchargers means" in terms of flow masses, pressures and enthalpies and in view of series connections of such components. Therefore, it is also clear what "high" or "low" define clearly the features of a supercharger or of a turbine in this context. In this regard in the following description the term "compressor" and the term "supercharger" are used with the same meaning. With reference again to FIG. 1, the low pressure charge cooler 12 and the high pressure charge air cooler 13 are options.

According to the invention, the LPC 11 is directly and operatively connected to the HPT 6. More precisely the LPC 11 is driven by the HPT 6 by means of an axial shaft 61. Moreover the HPT 6 is preferably connected to the engine 1 by a double connection (twin entry). This solution allows a better transient performance at low speed by gaining the pressure pulsation of the exhaust manifold at a line cylinder engine. In this regard, the direct connection of the engine is rarely subjected to constant exhaust pressure. In pulse turbocharged diesel engines, twin-entry turbines allow exhaust gas pulsations to be optimised, because a higher turbine pressure ratio is reached in a shorter time. Thus, through the increase of the pressure ratio, positive jetting flow, by improving the all-important time interval when a mass flow with high density is passing through the turbines.

As a result of this improved exhaust gas energy utilisation, the boost pressure characteristics of the engine and, hence, the torque behaviour is improved, particularly at low engine speeds.

As shown in FIG. 1, in order to prevent the various cylinders from interfering with each other during the charge exchange cycles, half number of cylinders are connected into one exhaust gas manifold 20 which forms the "outlet" of said combustion engine 1. Therefore the twin-entry of the HPT 6 allows the exhaust gas flow to be fed separately through the turbine.

According to a first main embodiment, the HPC 5 is rotationally associated with the LPT 7 through a coupling unit 10. The latter preferably comprises a "first gear assembly" (not shown in detail in FIG. 1) by means of which the rotational movement is transferred from the shaft 8 of the LPT 7 to the HPC 5 compressor. The first gear assembly has an adequate velocity ratio between the shaft 8 of the LPT 7 and the HPC 5. The coupling unit 10 also comprises a hydraulic clutch by means of which the LPT 7 and the HPC 5 can be connected mechanically and rotationally with the crankshaft of the combustion engine 1. In particular such mechanical connection (LPC 7 and HPC 5 with engine 1) is performed when the hydraulic clutch is "activated". On the contrary when the hydraulic clutch is "deactivated" then the HPC 5 is only connected to the LPT 7 (see below). The coupling unit 10 also comprises a "second gear assembly" designed so as to ensure an adequate velocity ratio between the crankshaft of the engine 1 and the LPT 7 and the compressor HPC 5.

Therefore according to the invention, the HPC 5 compressor is directly and permanently connected to the coupling unit 10. That means the HPC 5 is permanently connected to the LPT 7 and in case also with the engine crankshaft if the hydraulic clutch is activated. Always according to the invention, the working of the HPC 5 is controlled by means of the first bypassing means 3,4 above indicated. More in detail, when the first bypassing means 3,4 are activated/operated (that is when the valve 4 is opened) the air flow coming from the LPC 11 is bypassed into the pipe line 3 and the HPC 5 does not carry out any compression ratio. In such condition (first bypass means 3,4 activated/opened) substantially the entire air flow pass trough the pipe line 3, the impeller of the compressor HPC 5 continues to run because of its connection with the LPT 7 and/or with the engine. However no compression of the air mass flow is performed. In other words, the work of the HPC is reduced to the mechanical losses. More in detail, on the air mass flow circulating through the bypass from after the HPC 5 to the entry of HPC 5 (backwards flow) the HPC 5 will perform a volumetric flow delivery without compression work.

Therefore the compression work performed by the HPC 5 compressor depends on the activation/deactivation of the first bypass means 3,4. The working principle of the HPC 5 compressor is therefore advantageously few complex and much reliable. This is particular important for industrial applications.

According to a preferred embodiment, the engine apparatus comprises second bypass means 21,23 (comprising a second pipe 21 and a second valve 23) for bypassing the HPT 6 and third bypass means 25,26 (comprising a third pipe 25 and a third valve 26) for bypassing the LPT 7.

When the second bypass means 23,21 are activated the exhaust gases coming from the outlet of the engine 1 do not cross the HPT 6. In such condition de HPT 6 does not operate the LPC 11. The second bypass means 23,21 are advantageously activated in order to protect the LPC 11 from over speed when the hydrodynamic clutch of the coupling unit 10 is decoupled/deactivated. Indeed in such condition the LPT 7 (in its free running mode) does not generate a high backpressure sufficient to brake the HPT 6. Instead, said second bypassing means 21,23 allow to control the speed of the HPT 6 and consequently the speed of LPC 11 thereby connected.

When the third bypass means 25,26 are activated, the exhaust gases coming from the HPT 6 do not enter into the LPT 7. In particular the third bypass means 25,26 are activated during the engine brake mode of the engine. In such condition, the hydrodynamic clutch is activated and by activating the third bypass means 25,26 the LPT 7 does not deliver energy to the same hydraulic clutch and consequently to the engine. In this situation, by deactivating the first bypass means (valve 4 closed), the engine have to drive the HPC 5. This power loss of the engine due to the operation of the HPC 5 is welcome in the engine braking mode.

According to the present invention, the engine apparatus 1 above explained can advantageously works at least according to the following operative configurations:

a first configuration called "single stage configuration" in which the LPC 11 and the HPT 6 are activated and wherein the LPT 7 and HPC 5 are deactivated. In such configuration the first bypassing means 3,4 are activated (that means the mass airflow passes through the pipe line 3 and the valve 4); at the same time also the third bypassing means 25,26 are activated so that the LPT is bypassed;

a second configuration in which the LPC 11 and the HPT 6 are activated and in which the LPT 7 is deactivated and the HPT 5 is running; in particular the LPT 7 is deactivated by activating the third bypass means (exhaust gases flow through the pipeline 25 and the valve 26); as already above indicated, the apparatus works in this second configuration during the engine brake mode;

a third configuration in which the LPC 11 and the HPT 6 are deactivated and in which the LPT 26 and the HPC 5 are activated; in particular in such configuration the LPC 11 and the HPT 6 are deactivated by activating the second bypass means (exhaust gases flow through the pipeline 21 and the valve 23 which is opened; this configuration allows advantageously to heat up the after-treatment device of the engine apparatus;

a fourth configuration in which the LPC 11 and the HPT 11 are activated and in which the LPT 7 and the HPC 3 are free running; in particular in such configuration the hydraulic clutch of the coupling unit 10 is deactivated and therefore no torque is transmitted from the LPT 7 to the engine 1; therefore in such configuration first bypass means 3,4 are deactivated/closed (in particular they can be activated at high boost demand and deactivated at low boost demand), while second bypass means 21,23 and third bypass means 26,25 are deactivated;

a fifth configuration called "double stage configuration" in which the LPC 11 and the HPT 11 are activated and in which also the LPT 7 and the HPC 5 are operative connected to the engine by means of the hydraulic clutch; in detail said hydraulic clutch is activated so as to transmit torque from the LPT 7 to the engine 1; also in this fifth configuration the first bypass means 3,4 are deactivated/closed as well as the second bypass means 21,23 and the third bypass means 26,25 are deactivated.

The engine apparatus according to the invention comprise control means, comprising for example an electronic control unit (ECU), which controls the activation/deactivation of the first bypass means 3,4 as well as preferably the activation/deactivation of the second bypass 25,26, of the third bypass means 21,23 and also of the coupling element 10 that it the hydraulic clutch above indicated. The control means ECU substantially control and manage the engine apparatus so as to change the operative configuration of the apparatus itself from one to another.

The engine apparatus also comprises first detecting means, operatively connected to the control means ECU, for detecting the temperature of said exhaust gases. In particular such temperature is detected on said exhaust line before the HPT 6. The engine apparatus also comprises second detecting means of said Lambda value operatively connected to the control means ECU. Said second detecting means preferably comprises at least one pressure sensor and at least one temperature sensor arranged along the intake line and connected to the control means ECU (above indicated) in order to calculate the Lambda value. More in detail the control means ECU calculate the fuel demand and the mass air flow via the boost pressure and the temperature measured respectively by said at least one pressure sensor and said at least one said temperature sensor of said second detecting means. According to an alternative solution, the second detecting means could comprise an appropriate Lambda sensor connected operatively to the control means ECU above indicated.

The engine apparatus preferably comprises also engine brake means and an engine revolution speed sensor which can be, for example, the sensor traditionally mounted on a flywheel of the combustion engine. Moreover, the apparatus preferably comprises also at least a torque sensor for detecting the torque. Also the torque sensor is operatively connected to the control means ECU. Moreover a "fuel map" is preferably stored into control means ECU. On the basis of this fuel map and of the information coming from the torque sensor the control means ECU activate the engine brake.

It has to be noted that in the known solutions the control means are not connected to a torque sensor. In particular in known solutions, during the firing mode, the torque is looked up on the "fuel map" which comprises data relative to engine speed, torque and fuel mass. Normally the "fuel map" is defined and controlled on test benches. In the traditional solutions, following a request of the driver, the control means deliver the fuel mass on the basis of the fuel map, but there is not any feedback from the engine in terms of torque. Moreover, in the traditional solutions, during the braking mode the control means detect no feeding of fuel and the value of the brake torque also comes out from "braking map" containing data relative to engine speed and braking torque. Also this "braking map" is defined and calibrated on test benches.

Differently in the present invention the presence of a torque sensor communicating with the control means ECU allows to control the variations of the engine and in particular the cause of such variations. That enables to maintain the variations of the engine in a very close range and to compensate the aging and the wear during the live time.

In this regard, if an active injection is detected then the engine brake can not be activated. On the contrary if there is not an injection of fuel and if the speed of the engine is above a pre-established value (for example 1000 rpm), then the engine brake can be activated.

According to the invention, the strategy of the engine apparatus 1 comprises the step of deactivating said first bypassing means 3,4 when at least one of the following conditions occurs:

a) the exhaust temperature exceeds a predefined value (for example above 700° C.);
b) the Lambda values is below a predefined value;
c) the pressure ratio at the intake line (2) exceeds at least a surge value of the low pressure compressor LPC 11;
d) engine brake means are activated;
e) the engine revolution speed is under a predefined value.

In other words, according to the invention, starting substantially from the first operative configuration above indicated ("single stage configuration"), when at least one of the conditions a)-e) is verified then the first bypass means 3,4 are substantially closed so that the air mass flow passes through the HPC 5 to be compressed. In such condition, the HPC 5 can work actively on the air mass flow. On the contrary, when the first bypass means 3,4 are activated then the HPC 5 runs substantially without performing any compression of the air flow. The condition a)-e) above indicated are checked by the control means ECU which subsequently intervene on the first bypass means 3,4 of the engine apparatus. The control means ECU can check all the conditions a)-e) before to intervene on the first by passing means 3,4. Alternatively the control means ECU can intervene as soon as one of the conditions a)-e) is detected independently from the other control.

In particular when the condition indicated under point a) occurs then the control means ECU intervene by deactivating the first bypassing means 3,4 by and consequently by activating operatively the HPC 5 in order to produce additional air boost, to rise up the Lambda value and to reduce the combustion temperature. With reference to the condition indicated under point b), the Lambda value is calculated by the control means ECU from the air to fuel ratio according to the following formula:

$$\text{Lambda} = AFR/AFR_{stoichiometric}$$

wherein $AFR = m_{air}/m_{fuel}$ and $AFR_{stoichiometric}$ is defined as 14,545 for Diesel. It has been noted that the best efficiency with the least smoke is reached when the Lambda reaches values comprises in the range between 1.4-1.8. When the Lambda value, calculated by the control means ECU (see above) or alternatively detected by a Lambda sensor, goes out of this range them the first bypassing means 3,4 are activated/deactivated as the case. In particular if the in HPC 5 Lambda value is lower that 1.4 the first bypassing means 3,4 are deactivated (valve 4 closed). In practice the valve 4 of the bypassing is closed when Lambda value is too low (under 1.4). In such condition the clutch of the coupling element 10 is connected in order to achieve the requested Lambda. If the Lambda value keeps itself too low even in such conditions (first bypassing means 3,4 deactivated and clutch activated), then the control strategy will deactivate the clutch and the operative configuration is switch from the first configuration ("single stage configuration") to the fourth configuration of the engine apparatus above indicated in order to try to reach the requested Lambda. In particular in such fourth configuration the first bypassing means 3,4 are deactivated and LPT 7 and HPC 5 run free as a turbocharger with a higher speed without connection to the crank-shaft of the combustion engine 1. On the contrary when the Lambda value is higher than 1.8, then the first bypassing means 3,4 are deactivated (valve 4 opened).

With reference to the above condition under point c), when the engine apparatus is, for example, in the single stage configuration, at low engine speed (that is at low air mass flow) the pressure ratio of the LPC 11 compressor (that is the ratio between the pressures upstream and downstream the LPC 11) has to be increased in order to increase the torque at the engine. This is made by deactivating the first bypassing means 3,4.

The working map of the LPC 11 is clearly limited by the surge line in increasing pressure. Operating the compressor LPC 11 over the surge line the unsteady pulses would destroy the impeller. The location of the surge line in the LPC 11 working map depends on the compressor design and manufacturer. According to the invention, in order to increase the pressure ratio at low mass airflow the HPC 5 is used. By sectioning the pressure ratio from one (LPC) to two compressors (LPC and HPC) the higher pressure ratio could be reached without crossing the surge line of the LPC 11. It is clear that at a higher mass-flow the single compressor (LPC) could reach the claimed pressure ratio without surging, so the first bypassing means 3,4 can be activated and the HFC 5 can be switched off.

With reference to the condition indicated under point d), during the braking phase of engine of the vehicle, the first bypassing means 3,4 are deactivated (HPC 5 works actively on the air mass flow) in order to increase the engine brake power. In particular by deactivating the first by-passing means 3,4, the HPC 5 works on the intake air flow to transform the power from the drive-train into mechanical power for the driven compressor HPC 5. The engine braking mode is the result of a demand of the driver of the vehicle who by a switch or by the braking pedal, for example, sends a signal to the control means ECU which check the engine operating data and activate the braking mode. In particular the control means ECU deactivate the first bypassing means 3,4 according to what above indicated.

The engine apparatus 1 preferably comprises also an Exhaust Gas Recirculation (hereinafter EGR) system for reducing the nitrogen oxides during the combustion. The EGR is controlled by the difference between the pressure at the inlet 27 of the engine 1, that is the pressure measured in the proximity of the end of the intake line 2, and the pressure at the outlet of the engine pressure, that is the pressure measured at the manifold 20 that is at the beginning of the exhaust line 20 before upstream the HPT 6. If the pressure at the inlet 27 is higher than the pressure at the outlet 20 (negative charge cycle) exhaust gas recirculation is possible, and vice versa. Therefore, according to the present invention the mass-flow of EGR is regulated by deactivating/activating the first bypass means. In particular, by deactivating the first bypass means 3,4 the HPC 5 works on the intake air mass flow by increasing the pressure at the inlet 27 and therefore by restoring the conditions for the recirculation of the exhaust gases.

By summarizing what above, the engine apparatus 1 according to the invention is shifted in a "two stage configuration", by deactivating the first bypass means 3,4 (that is by operating the HPC 5 compressor) in order to:

to increase boost pressure and reduce exhaust gas temperature and improve transient response at low engine speed and mass flow rate, and to shift engine running line out of the low-pressure compressor (LPC 11) surge area in performance map, when a high pressure ratio is required at a low mass flow rate, and to increase engine brake power.

Consequently, a number of advantages are achieved by means of the present invention:
- the assets of the two stage turbo-charging systems single and double turbo-compound systems and the mechanical high pressure compressors are concentrated in one engine scheme,
- improving on transient engine performance,
- increasing in engine brake power,
- improving on recuperation strategy.

In order to better explain the advantages reachable by the present invention, some useful parameters are here defined:
- IMEP is the "average pressure" within an engine cylinder during a working cycle, calculated from an indicator diagram.

The "average pressure" is that produced in the combustion chamber during the operating cycle. It is an expression of the theoretical, frictionless power known as indicated horsepower. In addition to completely disregarding power lost to friction, indicated horsepower gives no indications as to how much actual power is delivered to the crankshaft for doing useful work. However, it is related to actual pressures that occur in the cylinder and can be used as a measure of these pressures. IMEP is equal to the "brake mean effective pressure" (hereinafter BMEP) plus "friction mean effective pressure (hereinafter FMEP)".

P_outlet=pressure after engine 20
p_inlet=pressure before engine 27
P_engine=Power at Crankshaft
P_recuperation=Recuperation Power Any technical process of power generation is accompanied by energy losses and entropy rise. Energy dissipation occurs during transport, conversion, generation, application, and it is inevitable. In addition to the law of nature of rising entropy a large amount of energy in the form of heat is wasted. "Waste Heat Recuperation Systems" recycle a portion of some losses and thus improve the efficiency in thermodynamic cycles.
- EPGE is the "Energy Potential Gas Exchange" is the energy exchanged. If the charge cycle work is positive the engine performs no work for charge and discharge the cylinder with the working fluid. So if the charge cycle work is positive the efficiency of the engine is increased (EPGE+).

If the charge-cycle work is negative the engine needs to expend some work for the gas exchange (EPGE−) therefore, the efficiency decreases.
- PFRC is Power fraction Recuperation is the energy. Systems with waste heat recuperation can recycle a portion of some losses and thus improve the efficiency in thermodynamic cycles. PFRC is the percentage factor of engine power and recuperation power (from the exhaust gases to the crankshaft).
- POFS=Potential of Fuel Saving (dimensionless ratio); this parameter may be described also by means of the following equations:

POFS=EPEG+PFRC

POFS=(IMEP/$p_{outlet}$−$P_{inlet}$)+($P_{engine}$/$P_{recuperation}$)

Therefore, EPEG and PFRC influence the engine efficiency.

Systems with exhaust gas recuperation usually have a higher backpressure (gas pressure at outlet) and a negative charge cycle work.

Standard two stage turbocharging system cannot recuperate energy but they could reach a positive charge cycle work.

Negative effects of EPEG can be compensated by increasing PFRC.

Figure 4:
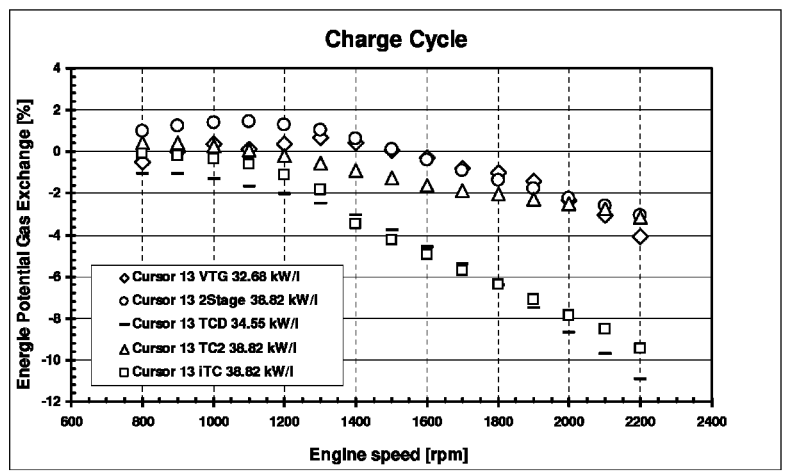
Figure 5:
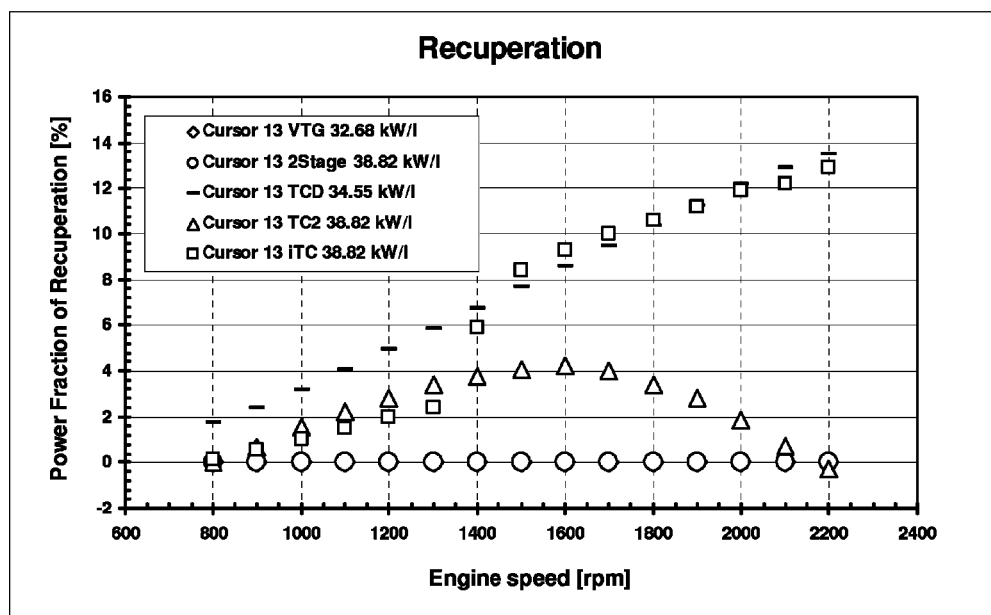

FIGS. 4, 5, and 6 show a comparison of several supercharging schemes applied to the same combustion engine (Cursor™) provided with:
- a variable turbine geometry [VTG] (referred with empty rhombuses);
- a two stage supercharger [2Stage] (referred with empty circles);
- a first turbo-compound [TCD] With Single stage Turbocharging (referred with flat strokes);
- a second turbo-compound [TC2], namely a Two stage turbocharging according to the scheme described on EP2042705 (referred with empty triangles);
- the embodiment of the present invention (iTC)(referred with empty rectangles).

In particular, the diagrams in the FIGS. 4-6 are plotted in order to show comparisons respectively of said quantities: POFS, EPEG, PFRC.

From 800-1500 rpm the engine of the apparatus according the present invention runs as a two stage turbo-compound system (HPC and LPT are connected to the crankshaft). From 1500-2200 rpm the HPC is disconnected by the first bypass means, while the LPT 7 is still connected.

FIG. 4 shows that the scheme of the present invention gives a surprising reduction in fuel saving starting from about 1500 RPM of the engine crankshaft, with respect to the knows schemes. In line with this result also the diagram on FIG. 6 shows a higher PFRC from 1500 RPM. And FIG. 5 shows a lower EPEG starting from about 1500 RPM of the engine crankshaft.

It seems that the total POFC is lower with respect to the TCD scheme, however the power density of the scheme according to the present invention is increased: 34 kW/l TCD vs 38 kW/l iTC.

A right comparison should be carried out between the scheme of the present invention (iTC) and the TC2 according to the patent EP2042705, wherein both systems have the same power density. Hence the POFC is clearly improved.

According to the present invention, the free running two stage mode, i.e. HPC and LPT deactivated, may be used to gain more positive charge cycle work in operating areas under 50% of nominal power rating in the map. This functioning condition is not shown in the FIGS. 2-5.

The point of switching of the HPC and LPT is not fixed and depend on the engine properties, the power target, the turbines properties, etc. . . .

Moreover, a better transient performance is achieved in respect of the scheme disclosed on EP2042705 and also with respect of the scheme disclosed on DE102005003714, because of the smaller air volume on the high pressure side for the high pressure layout. This cause also lower smoke levels at transient operation modes.

Moreover, with respect to a standard single stage Turbocompound, the present invention shows:
- a lower smoke emissions and lower working temperature at low engine speed,
- the power density is strongly increased especially at low engine speed.

It has to be noted that in braking mode condition, the engine apparatus 1 according to the invention generates a higher brake torque at lower engine speeds, cause of the smaller high pressure turbine. i.e. higher boost, compared to the scheme disclosed both in EP2042705 and in DE102005003714.

Both the embodiments enable to reduce the power demand of the engine coupled supercharger at high engine speeds, when the target lambda is achieved. Hereby the Fuel consumption is strongly reduced.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. Control method of a turbo-compound engine apparatus, said apparatus comprising:
   an internal combustion engine (1) having an air intake line (2) and a gases exhaust line (20)
   a low pressure compressor (11) and an high pressure compressor arranged (5) on said air intake line according to the flow direction of the air;
   a high pressure turbine (6) and a low pressure turbine (7) arranged on said exhaust line according to the flow directions the gases,
   wherein the high pressure turbine (6) is connected with a shaft to the said low pressure compressor (11) and said low pressure turbine (7) is connected to the high pressure compressor (5) and wherein said low pressure turbine (11) and said high pressure compressor (5) are connected to the engine crankshaft,
   first bypassing means (3,4) of said high pressure compressor (5),
   first detecting means for measuring an exhaust gas temperature;
   second detecting means for detecting the Lambda value;
   means for measuring the pressure downstream and upstream said low pressure compressor;
   engine brake means;
   engine revolution speed sensor;
   wherein said control method comprises the step of deactivating said first bypassing means when at least one of the following condition occurs:
   a) an exhaust temperature exceeds a predefined value,
   b) said Lambda value is below a predefined value;
   c) said pressure ratio at the intake line (2) exceeds at least a surge value of said low pressure supercharger (11),
   d) the engine brake means are activated,
   e) said engine speed is below a predefined value.

2. A control method according to claim 1, wherein if said engine apparatus comprises an exhaust gas recirculation (EGR) system, the method also comprise the steps of deactivating said first bypassing means if the pressure at the inlet (27) is lower than the pressure at the outlet (20) of said engine.

3. A control method according to claim 1, wherein said exhaust temperature is detected on the exhaust line (20) before said high pressure turbine (6).

4. A control method according to claim 1, wherein said condition b) occurs when said Lambda value is below about 1.4, said method comprising the step of activating said first bypassing means if the Lambda value overcome about 1.8.

5. A control method according to claim 1, wherein the engine apparatus comprises bypassing means (25,26) of said low pressure turbine (7), when said condition e) occurs then said bypass means (25,26) of said low pressure turbine (8) are activated.

6. A turbo-compound engine apparatus comprising:
   an internal combustion engine (1) having an air intake line (2) and a gases exhaust line (20)
   a low pressure compressor (11) and an high pressure compressor arranged (5) on said air intake line according to the flow direction of the air;
   a high pressure turbine and a low pressure turbine (7) arranged on said exhaust line according to the flow directions the gases,
   first bypass means for bypassing said high pressure turbine,
   wherein said high pressure turbine (6) is connected with a shaft to the said low pressure compressor (11) and wherein said high pressure compressor (5) is operated by said low pressure turbine and/or by said engine, said first bypassing means being deactivated when at least one of said condition occurs:
   an exhaust temperature exceeds a predefined value,
   b) said Lambda value is out of a predefined range;
   c) said pressure ratio at the intake line (2) exceeds at least a surge value of said low pressure supercharger (11),
   d) the engine brake means are activated,
   e) said engine speed is below a predefined value.

7. Engine apparatus according to claim 6, wherein said apparatus further comprises an exhaust gas recirculation (EGR) system, said first bypassing means being deactivated if the pressure at the inlet (27) of said engine is lower than the pressure at the outlet (20).

8. Engine apparatus according to claim 6, wherein said apparatus comprises control means which controls said first bypass means (3,4).

9. Engine apparatus according to claim 6, wherein said apparatus comprises a coupling unit (10) by means of which said low pressure turbine (7) is connected to said high pressure compressor (5), said coupling unit (10) comprising an hydraulic clutch which connects/disconnects said low pressure turbine (7) and said high pressure compressor (5) to/from said engine.

10. Engine apparatus according to claim 9, wherein said apparatus comprises second bypass means for bypassing (21, 23) said high pressure turbine (6), said second bypassing means (21,23) being operated when said hydraulic clutch disconnects said engine from low pressure turbine (7) and/or said high pressure compressor (5).

11. Engine apparatus according to claim 10, wherein said apparatus further comprises third bypass means (25,26) for bypassing said low pressure turbine (7), said third bypassing means being operated when said engine brakes means are activated.

12. Computer program comprising computer program code means adapted to perform all the steps of claim 1, when said program is run on a computer.

13. A computer readable medium having a program recorded thereon, said computer readable medium comprising computer program code means adapted to perform all the steps of claim 1, when said program is run on a computer.

* * * * *